United States Patent Office 3,734,908
Patented May 22, 1973

3,734,908
1,2,4-OXADIAZINE-3-ONES
Daniel Makula and Monique Druet, Lyon, and Beatrice Gonthier, Caluire, France, assignors to Progil, Paris, France
No Drawing. Original application Apr. 1, 1970, Ser. No. 24,859, now Pat. No. 3,696,099. Divided and this application May 5, 1972, Ser. No. 250,814
Int. Cl. C07d 87/52
U.S. Cl. 260—244 R          12 Claims

ABSTRACT OF THE DISCLOSURE 1,2,4-oxadiazine-ones, useful as algicides, bactericides and fungicides, are obtained by reacting an N-hydroxy-urea and a dihalogenated organic derivative having halogen atoms on two adjacent carbon atoms.

---

This is a divisional of application Ser. No. 24,859 filed Apr. 1, 1970, now U.S. Pat. 3,696,099.

The present invention relates to new heterocyclic compounds comprising oxygen and nitrogen in their ring, as well as their manufacture and their applications. It relates more especially to new oxadiazine-ones.

In the literature, compounds of this type have already been described but most of them are 1,3,5-oxadiazine-ones. To applicants' knowledge the only 1,2,4-isomers known until now are those bearing ketone groups either in the 5-position or in the 3 and 5-positions.

New 1,2,4 - oxadiazine-ones have now been provided which answer the general formula:

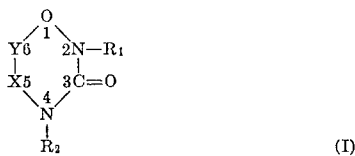

(I)

in which X and Y, identical or different, represent the $$-\overset{O}{\underset{\|}{C}}-$$

function or the $$-\overset{R}{\underset{|}{C}H}-$$

group in which R is hydrogen or CH$_3$—, with the exception of the compounds in which X is equal to $$-\overset{O}{\underset{\|}{C}}- \text{ and Y to } -\overset{R}{\underset{|}{C}H}-$$

R$_1$ and R$_2$—identical or different, indicate a lower alkyl residue or a phenyl radical having possibly one or several substituents chosen among halogens, and nitro, alkyl, alkoxy, trifluoromethyl groups.

Hence the compounds of Formula I may be perhydro-1,2,4-oxadiazine-3-ones; 3,6-diones and 3,5,6-triones. Under ambient conditions they are usually present in the form of white or slightly colored crystalline solids, usually soluble in common solvents, although some of them are oils.

The heterocycles of Formula I are produced, in a general way, by reacting, in the presence of a base, a conveniently substituted N-hydroxy-urea with a dihalogenated organic derivative having the halogen atoms on two adjacent carbons. It is possible to indicate, without limiting the invention field by theoretical explanations about reaction mechanism, that there occurs first a condensation of the dihalogenated derivative and hydroxy-urea, giving an O-substituted urea; then a cyclisation of this intermediary product, which leads to the heterocycle. Each of these reactions occur with the removal of an halogen atom. The total reaction may be schematized as follows:

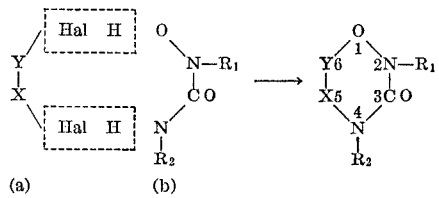

(a)        (b)

The N-hydroxy-ureas (b) used as raw materials are known type products, which may be obtained according to the usual techniques, for example by reaction of an N-substituted hydroxyl-amine with the convenient isocyanate. It is easily understood, with regard to Formula I hereinabove, that the dihalogenated derivatives (a) used in the process according to the invention may be, respectively, according to the desired final product, a 1,2-dihalogeno-ethane; 1,2-dihalogeno-propane; 2,3 - dihalogeno-butane; halogeno-acetyl halide; α-halogeno-propionyl halide; oxalyl halide.

There are used quantities of reagents corresponding at least to stoichiometry. But, in order to obtain a more complete reaction and to avoid the formation of by-products such as diureas, it is better to operate with an excess of dihalogenated derivative, with regard to N-hydroxy-urea quantity, the same as possibly with a base excess. Reaction is advantageously achieved in the presence of an organic solvent inert to the operative conditions.

The general process according to the invention has variants, according to the nature of the used dihalogenated reagent. When this reagent is an hydrocarbon derivative, which leads to the obtaining of a monoketonic heterocycle, there is generally used as a base, an alkali metal hydroxide, which is advantageously introduced into the reaction mixture as an aqueous solution. When using an acyl halide as a dihalogenated reagent, to obtain di-or triketonic heterocycles, use of an alkaline solution must be avoided as it would give rise to hydrolysis of the acyl halide. So, it is convenient, in this latter case, to substitute for alkaline hydroxides, a tertiary organic base, for fixing hydrogen halides, as for example triethyl-amine or pyridine. If acyl halide has only a radical Hal CO—, the reaction may be achieved in 2 stages: in the first stage, during which acyl halide is present in free state, the reaction is operated in the presence of a tertiary organic base; in the second stage, that is when the CO group of said acyl halide is linked to the initial urea, it is possible to use again an alkaline solution in order to achieve cyclisation.

In the same way, the organic solvent which may be used in the process varies with regard to the peculiar dihalogenated derivative. If it is an hydrocarbon derivative it is possible to choose the solvent from among aliphatic alcohols such as methanol or ethanol, aromatic hydrocarbons such as benzene, toluene, xylene, etc. If it is an acyl halide, the use of alcohols which would not be inert in operative conditions must be avoided and aromatic hydrocarbons are used or ketones, such as acetone, etc. Once the reaction has ended, the reaction mixture is first filtered if it has been carried out in the presence of organic base, in order to separate the hydro-halogenide formed during the reaction. If the process has been achieved in the presence of alkali metal hydroxide, filtration is not obligatory. However it may be useful, as it permits removal, in case of need, of the diruea which could have been formed as a secondary product. Then it is possible to wash the filtrate with an alkaline solution in order to remove from it any trace of non-transformed initial N-hydroxy-urea. Then the desired heterocycle is isolated by methods of known type, as for example by precipitation with water of oxadiazine-one or solvent evaporation. In this last case, the operation is followed with a water-washing, when reaction has been achieved in the presence of an alkaline hydroxide in order to remove the alkali metal halide formed during reaction. The final product may at last be recrystallized out of a convenient solvent such as an alcohol, as methanol or ethanol, a chlorinated aliphatic hydrocarbon such as chloroform, an aromatic hydro-carbon such as benzene or a mixture of alcohol and water, or of ketone and water.

Formula I compounds according to the invention possess interesting biocidal properties. Taken individually, they have been shown to be efficient, either separately, or the most generally, simultaneously, for combatting bacterian and fungic degradations the same as for destroying or inhibiting aglae growth. Moreover some of those bodies are nematocides. Besides, their pesticidal interest is increased by the fact that they are little toxic with regard to fish and mammals. So, for example ichthyaloxicity, studied on trouts, of 2-methyl 4-(3,4-dichlorophenyl perphydro-1,2,4-oxadiazine-3,6-dione is non-existent at the amount of 10 p.p.m. (parts per million) in water, in a 3 hour test. The LD 50 of this heterocycle (lethal amount corresponding to a 50% death-rate of the animals submitted to the test), studied on mice, is about 650 mg./kg. LD 50 of 4-methyl-2 phenyl perhydro-1,2,4-oxadiazine-3-one is greater than 1000 mg./kg.

The polyvalent activity of several of those compounds makes those ones quite useful for some applications, for example, for water treatment, and especially of industrial water circuits, (simultaneous fight against algae, bacteria, fungi) or for the protection of materials such as for example, glues (simultaneous fight against bacteria, fungi). As fungicides they are especially interesting for the protection of cellulosic materials such as wood, or textile fabrics and fibers, resins and elastomers, paints, varnishes, etc.

The compounds according to the invention are usable, as biocidal agents, as such or according to the usual formulations, with regard to contemplated uses. For example, they may be incorporated such as they are in the material to be treated, the solid products being previously only ground. They may also be applied by spraying or aspersion, in the form of liquid compositions, such as in aqueous suspensions or emulsions, organic or hydro-organic solutions. In those last cases, it is possible to use as solvents, classical products such as hydrocarbon, for example toluene, xylene, petroleum cuts, alcohols, ketons for example acetone, methylisobutyl-ketone, etc.

Moreover the compositions based on those active materials may contain various adjuvants such as solubilizing, dispersing, wetting, fiixing, stabilizing agents, for example alkali pyrophosphate, soya lecithin, alkyl metal lignosulfonates, carboxymethylcellulose, polyvinylic alcohol etc. Besides they may contain other biocides of known type.

The examples hereinafter illustrate the object of the invention. Examples 1 to 3 relate to the manufacture of heterocycles according to the invention. The following examples emphasize their biocidal activity.

EXAMPLE I

In a flask provided with a central stirring and an ascending cooler, 140 gm. (0.75 mole) or 1,2-dibromo ethane and 500 ml. of ethanol were boiled under reflux; then in about 1½ hr. there was added a solution of 40 gm. of sodium hydroxides (1 mole) in 250 ml. of water, containing 118 gm. (0.5 mole) of N-3,4-dichloro-phenyl N'-methyl N'-hydroxy-urea. Reflux was maintained during 2 hours after addition ended. Then the slightly cloudy solution was hot-filtered. After cooling, 1 litre of ice-water was added to the filtrate. The formed precipitate was separated by filtration and recrystallized out of chloroform. There was obtained 94 gm. of a white solid (yield 72% with regard to theory) melting at 91° C.

The chemical analysis has given the following results: Found (percent): N, 10.54; C, 46.28; H, 3.96; Cl, 27.05. Calculated (percent): N, 10.83; C, 46.0; H, 3.87; Cl, 27.1.

Mass spectrometry and nuclear magnetic resonance indicate that the structure of the obtained white solid corresponded to a 2-methyl 4-(3,4-di-chlorophenyl)-perhydro-1,2,4-oxadiazine 3-one (product No. 1).

In operating in the same conditions as hereinabove, from convenient raw materials there was prepared series of perhydro-1,2,4-oxadiazine 3-ones of Formula I the substituents $R_1$ and $R_2$ and the physical characteristics of which are given in the Table 1 hereinafter (for those compounds, $X=Y=CH_2$).

TABLE 1

| Product No. | $R_1$ | $R_2$ | Melting point (° C.) |
|---|---|---|---|
| 2 | $CH_3-$ | 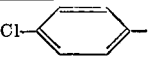 | 74-76 |
| 3 | $CH_3-$ | 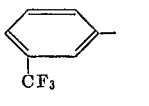 | Oil |
| 4 | $CH_3-$ | 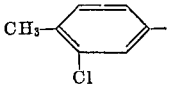 | 77 |
| 5 | $CH_3-$ | 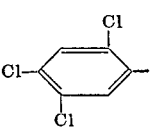 | 110 |
| 6 | $C_2H_5-$ | 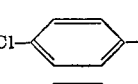 | 84 |
| 7 | $C_2H_5-$ | 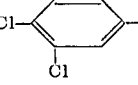 | 68 |
| 8 |  | $CH_3-$ | 134 |
| 9 | $N-C_3H_7-$ | 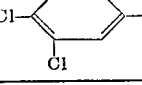 | Oil |

EXAMPLE 2

In a flask provided with a central stirring, there was introduced 236 gm. (1 mole) of N-3,4-dichloro phenyl N'-methyl-N'-hydroxy urea and 125 gm. (1.1 mole) of monochloroacetyl chloride in solution in 2500 ml. of anhydrous acetone; then there was added slowly at a temperature not exceeding 10° C., 101 gr. (1 mole) of triethyl-amine after half an hour, the amine hydrochloride formed was removed by filtration. Then, at the temperature of 20° C., an aqueous solution containing 40 gr. (1 mole) of sodium hydroxide was poured slowly into the filtrate the reaction mixture which first was neutral suddenly became basified. At this time, ice water was added to the mixture, the formed precipitate recovered by filtration and recrystallized from toluene. 205 g. of a white solid melting at 122° C. was obtained. Mass spectrometry has shown that this product structure corresponded to 2-methyl 4-(3-dichloro-phenyl) perhydro-1,2,4-oxadiazine 3,6-dione (product No. 10).

Operating in the same conditions as above, starting from other hydroxy-ureas, there were obtained other 1,2,4-oxadiazine-3,6-diones of Formula I with Y=CO, the structure and melting point of which are given in the following Table 2.

TABLE 2

| Product No. | X | $R_1$ | $R_2$ | Melting point (°C.) |
|---|---|---|---|---|
| 11 | —$CH_2$— | $CH_3$— | $NO_2$—◯— | 201 |
| 12 | —CH(CH_3)— | $CH_3$— | Cl—◯—Cl | 108 |
| 13 | Same as above. | $CH_3$— | Cl—◯(Cl)(Cl) | 93 |
| 14 | do | $CH_3$— | ◯—$CF_3$ | 85 |
| 15 | do | $CH_3$— | $CH_3O$—◯—$NO_2$ | 138 |

EXAMPLE 3

In a flask provided with a central stirring there was introduced 236 g. (1 mole) of N-3,4-dichlorophenyl N'-methyl-N'-hydroxy urea and 140 gr. (1.1 mole) of oxalyl chloride in solution in 2500 ml. of anhydrous acetone, then, at a temperature not exceeding 10° C. 202 gm. (2 moles) of triethyl amine was added and after 1 hour the formed amino hydrochloride was removed by filtration. Ice water was added to the filtrate, the formed precipitate was separated and recrystallized out of a mixture of acetone/water. There was obtained 172 gm. of a white solid melting at 142° C., which, by analysis has shown itself to be 2-methyl 4-(3,4-dichloro-phenyl) 1,2,4-oxadiazine-3,5,6-trione-(product No. 16).

EXAMPLE 4

Solutions of various heterocycles of the previous examples were prepared, by first dissolving the heterocycles in a polyalcohol ether known under the name of "Polyglycol 400," (that is the condensation product of ethylene oxide on one mole water, having a mean molecular weight of 400) then by diluting the solution in water in order to obtain concentrations of active ingredient varying between 1 and 50 p.p.m. Then those solutions were sown with suspensions of a mixture of unicellular green algae in which there was above all the species *Scenedesmus crassus;* then nutritive extracts were added to the obtained compositions and every sample was placed in artificial light for 12 or 24 hours at 25° C., during 8 days.

Thereafter either algae development (+) or the absence of development (—) or still a partial development (±) were evaluated. The obtained results are given in the Table 3 hereinafter.

TABLE 3

| Active ingredient Product No. | Amounts in p.p.m. | Algicidal activity |
|---|---|---|
| 1 | 1 | + |
|  | 10 | ± |
|  | 50 | — |
| 4 | 1 | + |
|  | 10 | ± |
|  | 50 | — |
| 10 | 1 | ± |
|  | 10 | — |
|  | 50 | — |
| 16 | 1 | + |
|  | 5 | ± |
|  | 10 | — |

EXAMPLE 5

Product 10 of Example 2 was introduced, in various amounts, into a nutritive mixture which was sown with bacterium *Staphylococcus aureus*. The mixture was incubated at optimal conditions during a time normally sufficient for bacteria development. This test provided determination of the minimal amount at which this product could be considered as being bacteriostatic. In order to know if it was also a bactericide, an aliquot part from the previous test was then introduced into a new nutritive mixture. Then, an absence of development of the active product for a determined amount corresponded to the death of all the present bacteria. The results of those bactericidal and bacteriostatic tests are given in Table 4, hereinafter, in which is indicated either bacterium development (+) or the absence of development (—) or a partial development (±).

TABLE 4

| Amounts (p.p.m.) | Efficiency Bacteriostatic | Bactericidal |
|---|---|---|
| 1 | + |  |
| 2 | ± |  |
| 4 | — |  |
| 8 | — | + |
| 12 | — | ± |
| 16 | — | — |
| 40 | — | — |

EXAMPLE 6

On series of fungi stocks the action of several amounts of 6 compounds from Examples 1 to 3, used in the form of solutions in acetone, were studied; the tests were conducted on a cellulosic support, according to the method described in French Standard X–41 502.

The results summarized in Table 5 hereinafter, are expressed in the following way:

— no development
± very light development (no conidies)
+ important mycelian or conidian development

TABLE 5

| Stocks | Product No. | Efficiency with regard to the amounts active ingredient (kg./l.) | | | | |
|---|---|---|---|---|---|---|
|  |  | $1.10^{-4}$ | $5.10^{-4}$ | $1.10^{-3}$ | $5.10^{-3}$ | $1.10^{-2}$ |
| *Polystictus versicolor* | 1 | ± | ± | — | — | — |
|  | 3 | ± | — | — | — | — |
|  | 4 | ± | — | — | — | — |
|  | 6 | + | + | ± | — | — |
|  | 10 | + | + | ± | — | — |
|  | 14 | + | + | ± | — | — |
| *Coniophora puteana* | 1 | + | + | ± | ± | — |
|  | 3 | + | + | ± | — | — |
|  | 4 | + | ± | ± | — | — |
|  | 6 | + | + | ± | — | — |
|  | 10 | + | + | ± | — | — |
|  | 14 | + | + | ± | — | — |
| *Gyrophana lacrymans* | 1 | + | ± | — | — | — |
|  | 3 | ± | ± | — | — | — |
|  | 4 | ± | — | — | — | — |
|  | 6 | ± | — | — | — | — |
|  | 10 | + | ± | — | — | — |
|  | 14 | + | + | ± | — | — |
| *Chaetomium globosum* | 1 | ± | ± | — | — | — |
|  | 3 | ± | ± | — | — | — |
|  | 4 | ± | ± | — | — | — |
|  | 6 | ± | ± | — | — | — |
|  | 10 | ± | — | — | — | — |
|  | 14 | + | + | ± | ± | — |
| *Sterigmatocystis nigra* | 1 | ± | ± | — | — | — |
|  | 3 | + | + | ± | ± | — |
|  | 4 | ± | ± | — | — | — |
|  | 6 | ± | ± | — | — | — |
|  | 10 | ± | — | — | — | — |
|  | 14 | + | + | + | ± | — |

What is claimed is:
1. An oxadiazine-one of the formula

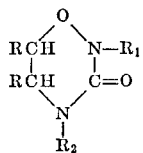

wherein

R is hydrogen or $CH_3$;
$R_1$ is alkyl of 1 to 5 carbon atoms, or phenyl and
$R_2$ is alkyl of 1 to 5 carbon atoms, phenyl, phenyl mono-, di-, or tri-substituted with halogen, nitro, alkyl of 1 to 3 carbon atoms, or alkoxy of 1 to 3 carbon atoms or phenyl mono-substituted with trifluoromethyl.

2. An oxadiazine-one according to claim 1 wherein R is hydrogen.
3. An oxadiazine-one according to claim 2 wherein $R_1$ is methyl.
4. An oxadiazine-one according to claim 3 wherein $R_2$ is

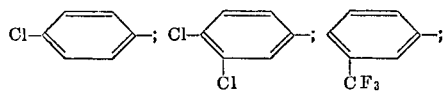

5. An oxadiazine-one according to claim 2 wherein $R_1$ is ethyl.
6. An oxadiazine-one according to claim 5 wherein $R_2$ is

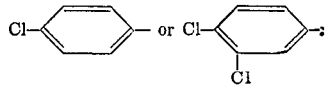

7. An oxadiazine-one according to claim 2 wherein $R_1$ is

and $R_2$ is methyl.

8. An oxadiazine-one according to claim 2 wherein $R_1$ is $N-C_3H_7-$ and $R_2$ is

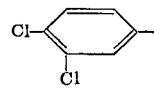

9. An oxadiazine-one according to claim 3 wherein $R_2$ is 3,4-di-chlorophenyl.
10. An oxadiazine-one according to claim 3 wherein $R_2$ is

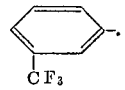

11. An oxadiazine-one according to claim 3 wherein $R_2$ is

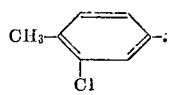

12. An oxadiazine-one according to claim 5 wherein $R_2$ is

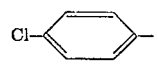

References Cited
UNITED STATES PATENTS 3,625,968  12/1971  Zschocke et al. _____ 260—244

HARRY I. MOATZ, Primary Examiner

U.S. Cl. X.R.

424—248; 260—553 R, 553 A